US012560460B2

(12) United States Patent　　(10) Patent No.:　US 12,560,460 B2
Kubozono et al.　　(45) Date of Patent:　Feb. 24, 2026

(54) SCALE AND MANUFACTURING METHOD OF THE SAME

(71) Applicant: MITUTOYO CORPORATION, Kanagawa (JP)

(72) Inventors: Hiroto Kubozono, Kanagawa (JP); Kosaku Miyake, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 230 days.

(21) Appl. No.: 18/524,385

(22) Filed: Nov. 30, 2023

(65) Prior Publication Data

US 2024/0200984 A1　Jun. 20, 2024

(30) Foreign Application Priority Data

Dec. 16, 2022　(JP) .................................. 2022-201076
Oct. 16, 2023　(JP) .................................. 2023-178016

(51) Int. Cl.
G01D 5/20　(2006.01)
(52) U.S. Cl.
CPC .................................. G01D 5/2053 (2013.01)
(58) Field of Classification Search
CPC .................................................. G01D 5/2053
See application file for complete search history.

(56) References Cited

U.S. PATENT DOCUMENTS 5,705,972 A * 1/1998 Ikemoto ............... G01D 5/2093
336/115
6,545,461 B1 * 4/2003 Miyata ................. G01D 5/2053
324/207.17

2002/0097043 A1　7/2002　Sasaki et al.
2016/0054151 A1　2/2016　Nozawa
2017/0074687 A1　3/2017　Hirata
2019/0346293 A1　11/2019　Kato
2022/0082411 A1 *　3/2022　Aoki ................... G01D 5/2053

FOREIGN PATENT DOCUMENTS

| JP | 06-216495 A | 8/1994 |
|---|---|---|
| JP | 10-332360 A | 12/1998 |
| JP | 11-064614 A | 3/1999 |
| JP | 2002-213906 A | 7/2002 |
| JP | 2003-166853 A | 6/2003 |
| JP | 2008-126230 A | 6/2008 |
| JP | 2016-044967 A | 4/2016 |
| JP | 2016-206086 A | 12/2016 |
| JP | 2017-058138 A | 3/2017 |
| JP | 2019-196969 A | 11/2019 |

* cited by examiner

*Primary Examiner* — Walter L Lindsay, Jr.

*Assistant Examiner* — Milton Gonzalez

(74) *Attorney, Agent, or Firm* — Rankin, Hill & Clark LLP

(57)　　　ABSTRACT

A scale includes a substrate, a plurality of scale patterns that are arranged along a measurement direction with a constant period on a surface of the substrate and are made of conductor, and a plurality of dummy patterns that are provided on at least a part of a region on the surface of the substrate where the plurality of scale patterns are not provided, and are made of the same conductors as the plurality of scale patterns. A diameter of a largest circle that can be formed in each of the plurality of dummy patterns centering on a point in each of the plurality of dummy patterns is ¼ or less of the period of the plurality of scale patterns.

12 Claims, 14 Drawing Sheets

FIG. 2
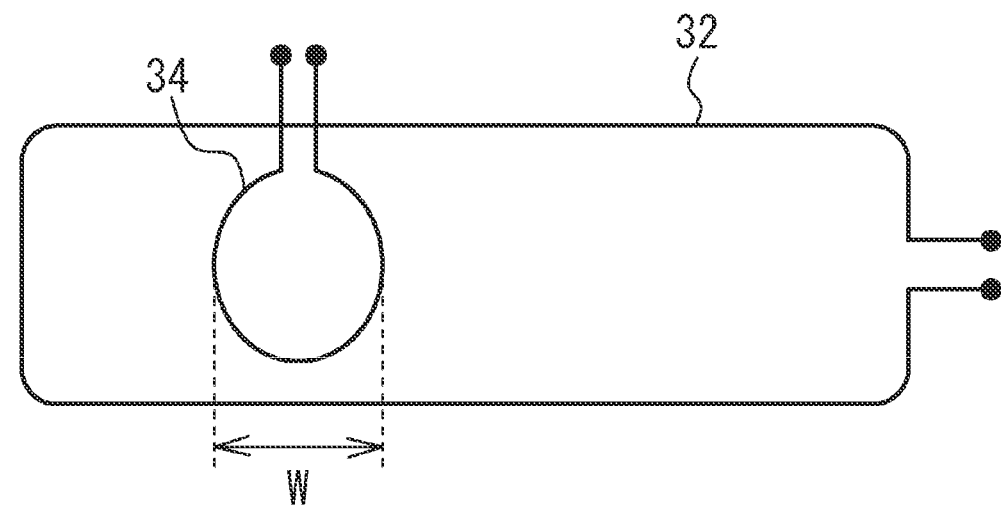
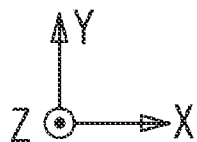

SCALE AND MANUFACTURING METHOD OF THE SAME

CROSS-REFERENCE TO RELATED APPLICATION

This application is based upon and claims the benefit of priority of the prior Japanese Patent Application No. 2022-201076 filed on Dec. 16, 2022 and Japanese Patent Application No. 2023-178016 filed on Oct. 16, 2023, the entire contents of which are incorporated herein by reference.

FIELD

A certain aspect of embodiments described herein relates to a scale and a manufacturing method of the scale.

BACKGROUND

A photoelectric encoder is known in which light emitted from a light source and passed through a scale is received by a light receiving part (for example, Japanese Patent Application Publication No. 2017-058138). Also known is an electromagnetic induction type encoder that utilizes electromagnetic coupling between a scale and a detection head (for example, Japanese Patent Application Publication No. 2019-196969).

SUMMARY

In one aspect, the present invention aims at reducing the processing time and reducing the load on the environment.

According to an aspect of the present invention, there is provided a scale including: a substrate; a plurality of scale patterns that are arranged along a measurement direction with a constant period on a surface of the substrate and are made of conductor; and a plurality of dummy patterns that are provided on at least a part of a region on the surface of the substrate where the plurality of scale patterns are not provided, and are made of the same conductors as the plurality of scale patterns, wherein a diameter of a largest circle that can be formed in each of the plurality of dummy patterns centering on a point in each of the plurality of dummy patterns is ¼ or less of the period of the plurality of scale patterns.

According to another aspect of the present invention, there is provided a scale including: a substrate; a plurality of scale patterns that are arranged along a measurement direction on a surface of the substrate and are made of conductor; and a plurality of dummy patterns) that are provided on at least a part of a region on the surface of the substrate where the plurality of scale patterns are provided, and are made of the same conductors as the plurality of scale patterns, wherein a diameter of a largest circle that can be formed in each of the plurality of dummy patterns centering on a point in each of the plurality of dummy patterns is ½ or less of a width in the measurement direction of a receiving coil that is electromagnetically coupled with magnetic flux generated by the plurality of scale patterns and detects a phase of the magnetic flux.

According to another aspect of the present invention, there is provided a manufacturing method of a scale including: forming a plurality of scale patterns that are arranged along a measurement direction with a constant period on a surface of a substrate and are made of conductor; and forming a plurality of dummy patterns that are provided on at least a part of a region on the surface of the substrate where the plurality of scale patterns are not provided, and are made of the same conductors as the plurality of scale patterns, wherein a diameter of a largest circle that can be formed in each of the plurality of dummy patterns centering on a point in each of the plurality of dummy patterns is ¼ or less of the period of the plurality of scale patterns.

According to another aspect of the present invention, there is provided a manufacturing method of a scale that is used for an electromagnetic induction type encoder that has the scale and a detection head configured to move relative to the scale in a measurement direction, the detection head having a receiving coil configured to be electromagnetically coupled to magnetic flux generated by the scale and detect a phase of the magnetic flux, the method including: forming a plurality of scale patterns that are arranged along a measurement direction on a surface of the substrate and are made of conductor; and forming a plurality of dummy patterns that are provided on at least a part of a region on the surface of the substrate where the plurality of scale patterns are provided, and are made of the same conductors as the plurality of scale patterns, wherein a diameter of a largest circle that can be formed in each of the plurality of dummy patterns centering on a point in each of the plurality of dummy patterns is ½ or less of a width in the measurement direction of a receiving coil.

BRIEF DESCRIPTION OF DRAWINGS

FIG. 2 is a diagram illustrating a transmission coil and a receiving coil provided in a detection head of an electromagnetic induction type encoder;

DESCRIPTION OF EMBODIMENTS

A scale has a base material and a scale pattern provided on a substrate. A scale pattern is generally formed by patterning a conductor film provided on the substrate. If a large amount of the conductor film is removed during patterning, the processing time may be lengthened and/or the load on the environment may be increased.

A description will be given of embodiments with reference to drawings.

Figure 1A:
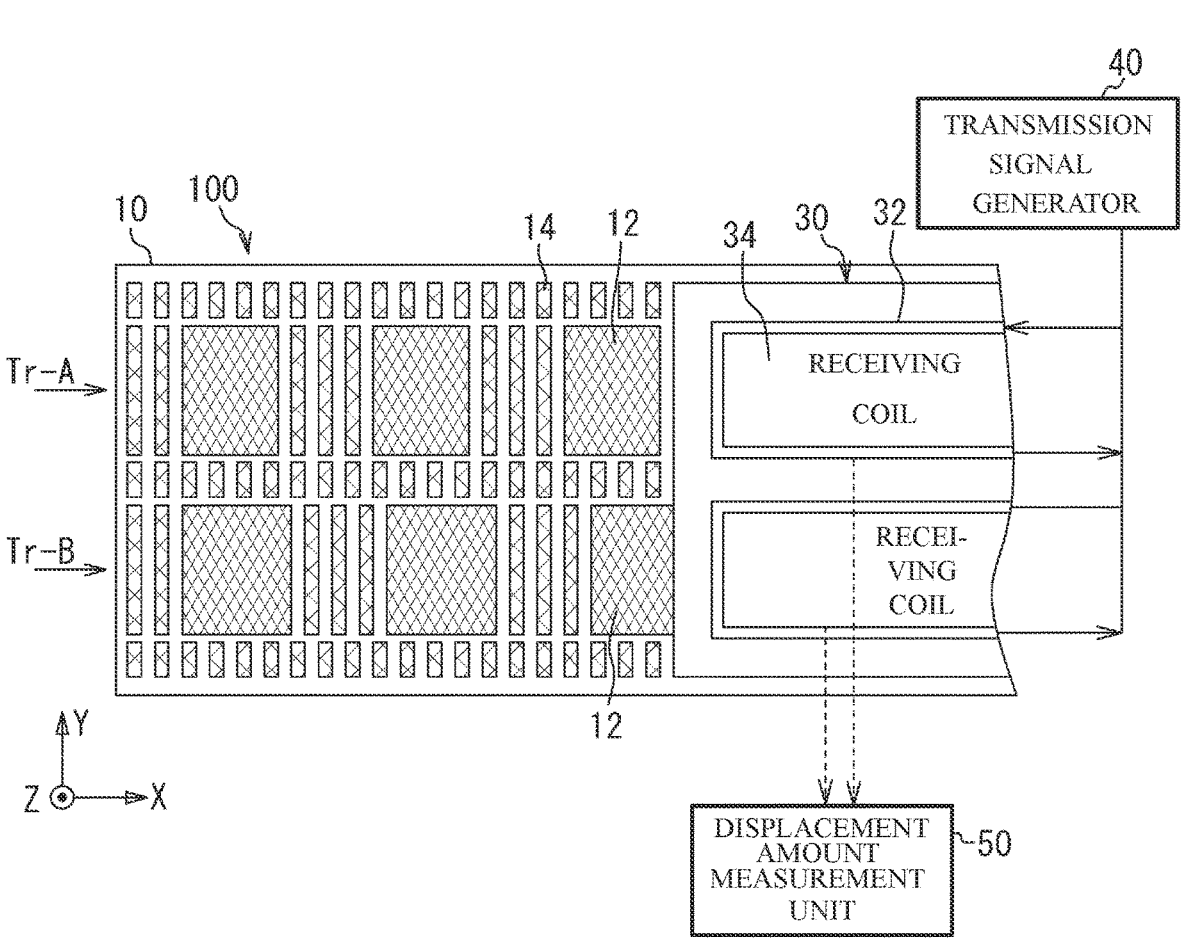
FIG. 1A is a diagram illustrating a configuration of an electromagnetic induction type encoder equipped with a scale according to a first embodiment.

(First embodiment) FIG. 1A is a diagram illustrating the configuration of an electromagnetic induction type encoder 1000 having a scale 100 according to a first embodiment. In FIG. 1A, the scale pattern 12 and a dummy pattern 14 are hatched for clarity of illustration. As illustrated in FIG. 1A, the electromagnetic induction type encoder 1000 has the scale 100 and a detection head 30 that move relative to each other in a measurement direction. Each of the scale 100 and the detection head 30 has a substantially flat plate shape and is opposed to each other with a predetermined gap therebetween. The electromagnetic induction type encoder 1000 also includes a transmission signal generator 40, a displacement measurement unit 50, and the like. In FIG. 1A, an X-axis represents a displacement direction (measurement direction) of the detection head 30. In the plane formed by the scale 100, the direction orthogonal to the X-axis is defined as a Y-axis. A thickness direction of a substrate 10 forming the scale 100 is defined as a Z-axis.

The detection head 30 is provided with a transmission coil 32, a receiving coil 34, and the like. The transmission coil 32 constitutes a rectangular coil having a length direction in the X-axis direction. As illustrated in FIG. 1A, the receiving coil 34 is arranged inside the transmission coil 32. The shape of the receiving coil 34 will be described later.

In the scale 100, a plurality of scale patterns 12 made of conductors are arranged on the surface of the substrate 10 along the X-axis direction with a period λ. The period λ corresponds to the distance between the centers of two adjacent scale patterns 12 in the X-axis direction. The scale pattern 12 is, for example, a plate-like conductor pattern without holes. The scale pattern 12 is electromagnetically coupled with the transmission coil 32 and electromagnetically coupled with the reception coil 34.

A plurality of dummy patterns 14 made of conductors are provided on at least a part of a region on the surface of the substrate 10 where the plurality of scale patterns 12 are not provided. Details of the plurality of dummy patterns 14 will be described later.

Figure 1B:
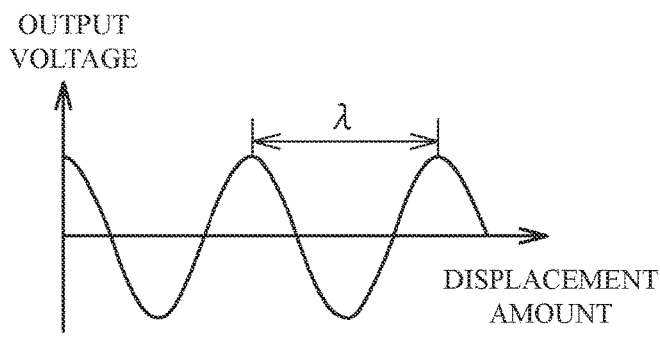
FIG. 1B is a diagram illustrating a detected sine wave signal.

The transmission signal generator 40 generates a single-phase AC (Alternating Current) transmission signal and supplies the single-phase AC transmission signal to the transmission coil 32. In this case, magnetic flux is generated in the transmission coil 32. As a result, electromotive currents are generated in the plurality of scale patterns 12. The plurality of scale patterns 12 are electromagnetically coupled with the magnetic flux generated by the transmission coil 32 to generate magnetic flux that changes at a predetermined spatial period in the X-axis direction. The magnetic flux generated by the scale pattern 12 causes an electromotive current in the receiving coil 34. The electromagnetic coupling between the scale pattern 12 and the receiving coil 34 changes according to the amount of displacement of the detection head 30. As a result, a sine wave signal having the same period as the period λ is obtained, as illustrated in FIG. 1B. Therefore, the receiving coil 34 detects the phase of the magnetic flux generated by the plurality of scale patterns 12.

By electrically interpolating this sine wave signal, the displacement measurement unit 50 can use the sine wave signal as a minimum resolution digital quantity, and measures the displacement of the detection head 30. In FIG. 1B, the horizontal axis represents the amount of displacement of the detection head 30, and the vertical axis represents the output voltage of the receiving coil 34.

The transmission coil 32, the receiving coil 34, and the scale pattern 12, which are electromagnetically coupled to each other, form one track. As illustrated in FIG. 1A, the electromagnetic induction type encoder 1000 is assumed to have a first track Tr_A and a second track Tr_B. The first track Tr_A and the second track Tr_B are arranged with a predetermined interval in the Y-axis direction. The period λ differs between the tracks. Thereby, the electromagnetic induction type encoder 1000 functions as an absolute (ABS) type encoder.

FIG. 2 is a diagram illustrating the transmission coil 32 and the receiving coil 34 provided in the detection head 30 of the electromagnetic induction type encoder 1000. As illustrated in FIG. 2, the receiving coil 34 is arranged inside the transmission coil 32 forming a rectangular coil. The receiving coil 34 is, for example, a circular coil. "W" is the width of the receiving coil 34 in the X-axis direction. This width W is the width of the receiving coil 34 in the measurement direction. Note that the receiving coil 34 may have other configurations. For example, the receiving coil 34 is composed of a first coil and a second coil each having a shape that advances sinusoidally in the negative direction of the X-axis, turns back, and advances sinusoidally in the positive direction of the X-axis. In this case, the width of the receiving coil 34 in the measurement direction is the width of one annular portion of the first coil and the second coil in the X-axis direction.

Figure 3:
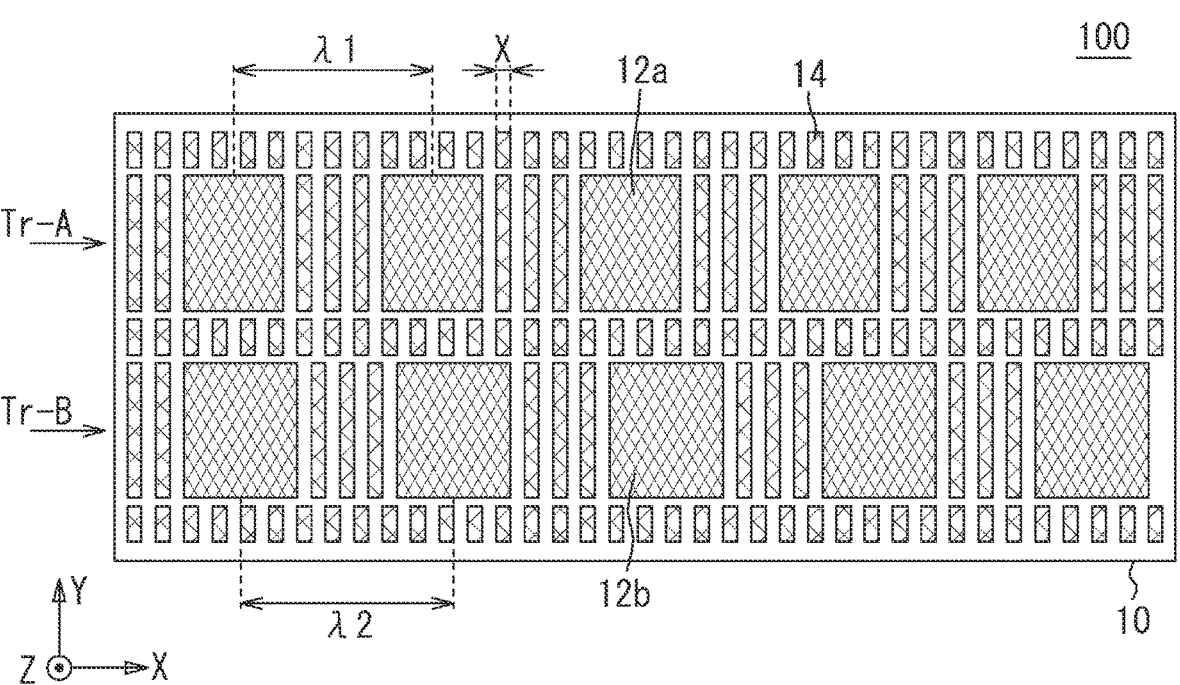
FIG. 3 is a plan view illustrating a scale according to a first embodiment.

FIG. 3 is a plan view illustrating the scale 100 according to the first embodiment. As illustrated in FIG. 3, the scale 100 of the first embodiment includes the substrate 10, plurality of scale patterns 12a and 12b provided on the surface of the substrate 10, and the plurality of dummy patterns 14 provided in regions of the surface of the substrate 10 where the scale patterns 12a and 12b are not provided.

The substrate 10 is an insulating base material such as polycarbonate or glass. The substrate 10 may be a resin base material, or may be an insulating base material other than the resin base material. When a laminated substrate having a metal film on one side or both sides is used, the substrate 10 may be made of glass epoxy resin or may be prepreg.

The scale pattern 12a and the scale pattern 12b are made of the same conductor such as aluminum, copper, silver, or gold, and have the same thickness. The plurality of scale patterns 12a and 12b are plate-like conductor patterns without holes. The plurality of scale patterns 12a are arranged at a period of λ1 along the X-axis direction. The plurality of scale patterns 12b are arranged along the X-axis direction with a period λ2 longer than the period λ1. The plurality of scale patterns 12a form the first track Tr_A, and the plurality of scale patterns 12b form the second track Tr_B.

The dummy pattern 14 is made of the same conductor as the scale patterns 12a, 12b and has the same thickness as the scale patterns 12a, 12b. The dummy pattern 14 is a plate-shaped conductor pattern without holes, and has, for example, a rectangular shape elongated in the Y-axis direction in a plan view. The plurality of dummy patterns 14 may include rectangular patterns having different lengths in the X-axis direction and/or the Y-axis direction. The width X of the dummy pattern 14 is equal to or less than ¼ of the shorter period λ1 of the period λ1 of the plurality of scale patterns 12a and the period λ2 of the plurality of scale patterns 12b.

The surface of the substrate 10 is exposed to atmosphere in areas where the plurality of scale patterns 12a, 12b and the plurality of dummy patterns 14 are not provided on the surface of the substrate 10.

Figure 4:
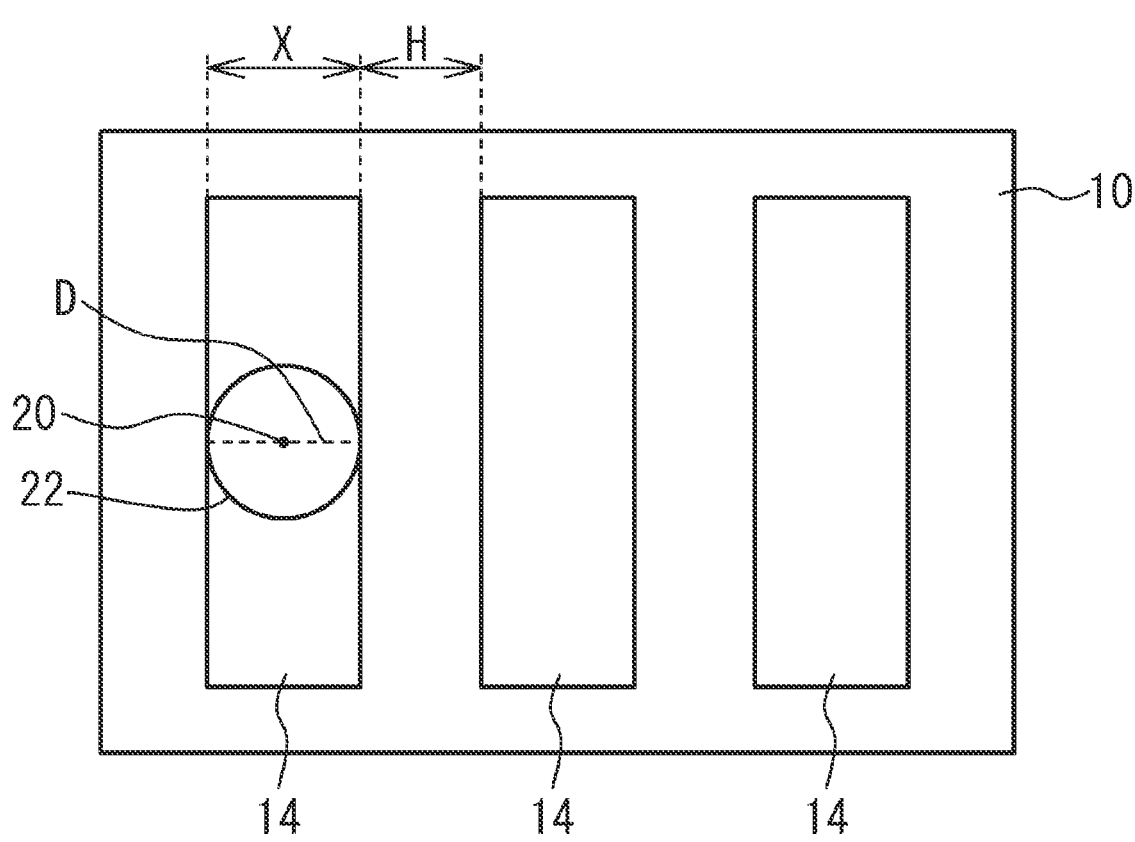
FIG. 4 is a plan view illustrating a dummy pattern in a first embodiment.

FIG. 4 is a plan view illustrating the dummy pattern 14 in the first embodiment. As illustrated in FIG. 4, the diameter D of a largest circle 22 which is a circle contacting the side of the outer shape of the dummy pattern 14 when the diameter is increased around a point 20 in the dummy pattern 14 has the same size as the width X of the dummy pattern 14 and is less than or equal to $\lambda\frac{1}{4}$.

Note that there is no particular limitation on the size of the interval H between the adjacent dummy patterns 14. However, in order to keep the amount of the conductor film removed when forming the scale patterns 12a and 12b and the dummy pattern 14 small, the interval H is preferably smaller than the diameter D of the circle 22, more preferably equal to or less than half of the diameter D, and even more preferably equal to or less than $\frac{1}{4}$ or less of the diameter D.

Figure 5:
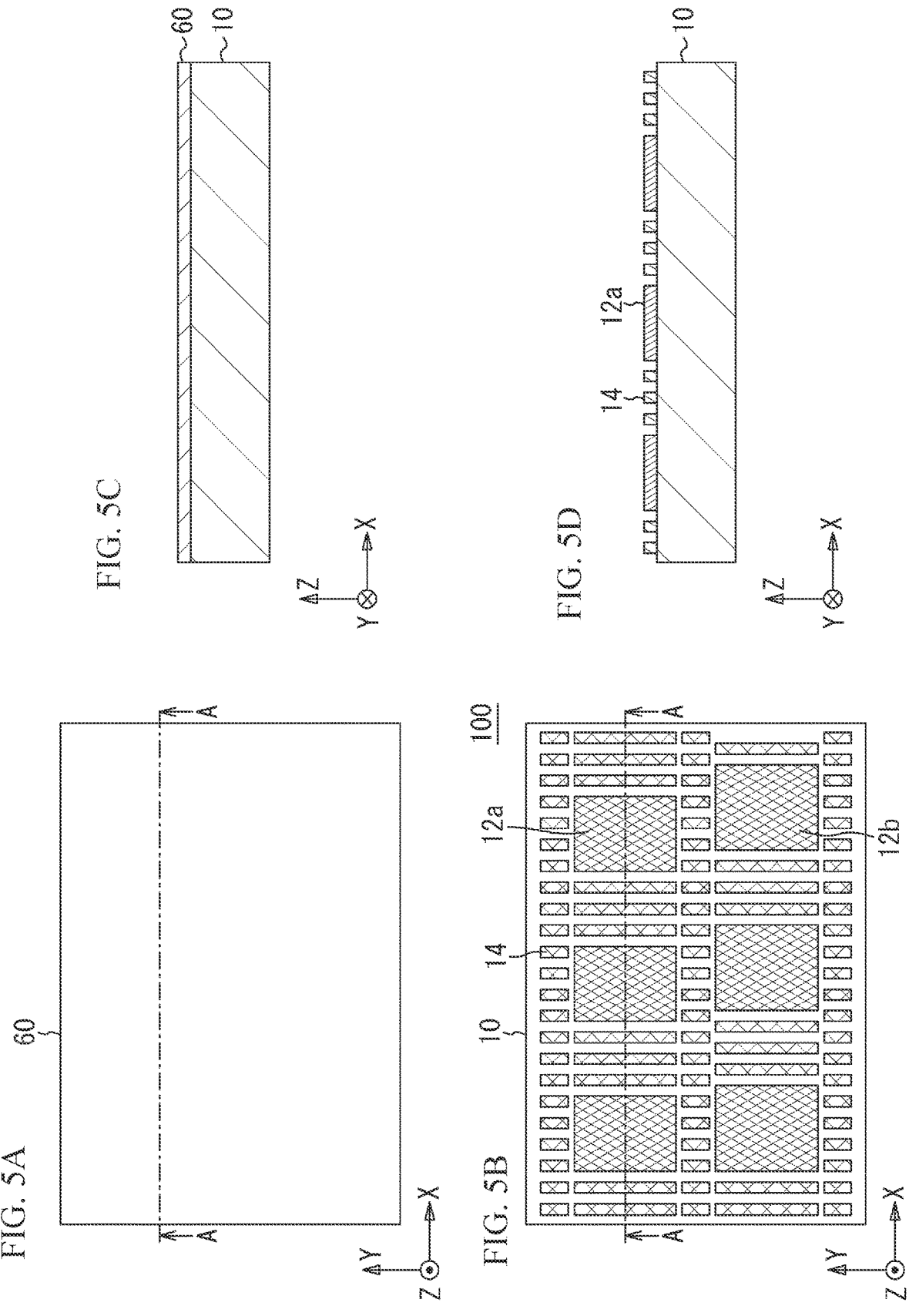
FIG. 5A to FIG. 5D are diagrams illustrating a manufacturing method of a scale according to a first embodiment.

[Manufacturing method] FIG. 5A to FIG. 5D are diagrams illustrating a manufacturing method of the scale 100 according to the first embodiment. FIG. 5A and FIG. 5B are plan views illustrating the method of manufacturing the scale 100. FIG. 5C and FIG. 5D are cross sectional views taken along a line A-A of FIG. 5A and FIG. 5B. As illustrated in FIG. 5A and FIG. 5C, a conductor film 60 such as aluminum, copper, silver or gold on the surface of the substrate 10 by, for example, sputtering, vapor deposition, plating, paste printing, or attaching a metal foil. As illustrated in FIG. 5B and FIG. 5D, the conductor film 60 is patterned by, for example, laser processing or etching processing using photolithography and etching. As a result, the plurality of scale patterns 12a and 12b and the plurality of dummy patterns 14 are formed on the surface of the substrate 10. Thereby, the scale 100 of the first embodiment is formed.

Figure 6:
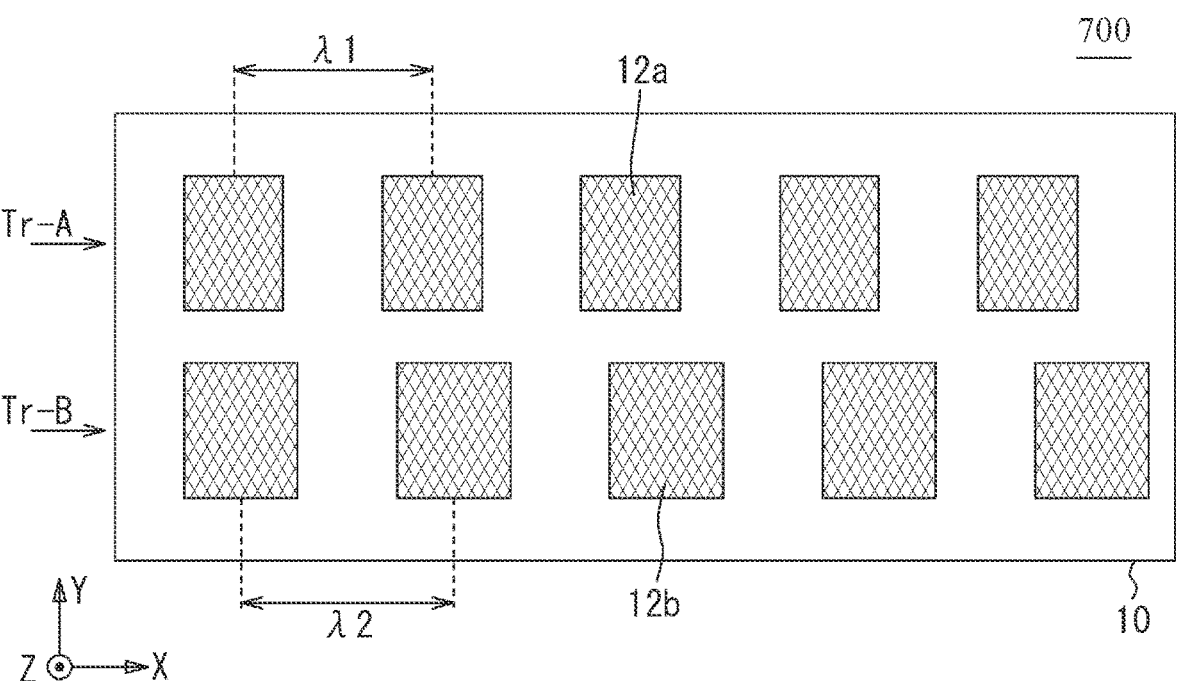
FIG. 6 is a plan view illustrating a scale according to a comparative example.

[Comparative example] FIG. 6 is a plan view illustrating a scale 700 according to a comparative example. As illustrated in FIG. 6, in the scale 700 of the comparative example, the plurality of scale patterns 12a and 12b are provided on the surface of the substrate 10, but no dummy pattern is provided. Therefore, the surface of the substrate 10 is exposed in areas where the plurality of scale patterns 12a and 12b are not provided on the surface of the substrate 10.

Similar to the scale 100 according to the first embodiment, the scale 700 of the comparative example is formed by forming the conductor film 60 on the surface of the substrate 10 and then patterning the conductor film 60 by, for example, laser processing or etching and forming the scale patterns 12a and 12b.

In the comparative example, the conductor film 60 in the regions other than the regions where the plurality of scale patterns 12a and 12b are formed is removed by laser processing or etching processing. In this case, the amount of the conductor film 60 to be removed by laser processing or etching processing increases. In the case of laser processing, the processing time becomes longer. In the case of etching processing, the amount of waste liquid increases, increasing the load on the environment.

On the other hand, according to the first embodiment, as illustrated in FIG. 3, the plurality of dummy patterns 14 made of the same conductor as the scale patterns 12a and 12b are provided on the surface of the substrate 10 other than the regions where the plurality of scale patterns 12a and 12b are provided. Therefore, in FIG. 5B and FIG. 5D, when the conductor film 60 is laser-processed or etched to form the plurality of scale patterns 12a and 12b and the plurality of dummy patterns 14, the amount of the conductor film 60 to be removed is reduced. Therefore, the processing time can be shortened and the load on the environment can be reduced. The reason why the load on the environment is reduced is that the amount of etchant used is reduced due to the reduction of the etching area in the case of forming by etching. Since the amount of etching solution used is reduced, cost reduction can also be achieved. In the case of manufacturing the scale 100 by repeatedly using the etchant, the amount of the conductor film 60 to be removed is reduced. In this case, fluctuations in the concentration of reaction products in the etchant are reduced. Therefore, fluctuations in etching conditions are moderated, and processing variations can be reduced. Moreover, when forming by laser processing, the amount of conductors discarded as dust can be reduced. Therefore, debris or the like generated when the conductor film 60 is removed is suppressed from adhering to the scale patterns 12a and 12b, so that defects in the scale 100 are less likely to occur. As illustrated in FIG. 4, the diameter D of the largest circle 22 that can be formed in the dummy pattern 14 centering on the point 20 in the dummy pattern 14 is $\frac{1}{4}$ or less of the period $\lambda 1$ of the scale pattern 12a and $\frac{1}{4}$ or less of the period $\lambda 2$ of the scale pattern 12b. This makes it difficult to generate an induced current in the dummy pattern 14. Therefore, even if the dummy pattern 14 is provided on the surface of the substrate 10, the influence on the measurement using the electromagnetic coupling between the scale 100 and the detection head 30 can be suppressed. Preferably, the dummy pattern 14 is provided in an area of 40% or more of the area where the scale patterns 12a and 12b are not provided on the surface of the substrate 10 so that the amount of the conductor film 60 to be removed is small. It is more preferable that the dummy pattern 14 is provided in an area of 50% or more of the area. It is still more preferable that the dummy pattern 14 is provided in an area of 60% or more of the area. It is even more preferable that the dummy pattern 14 is provided in an area of 60% or more of the area. Also, the diameter D of the circle 22 is preferably $\frac{1}{5}$ or less, more preferably $\frac{1}{8}$ or less, and even more preferably $\frac{1}{10}$ or less of the period $\lambda 1$ and the period $\lambda 2$ so that an induced electromotive current is less likely to occur in the dummy pattern 14.

Figure 7A:
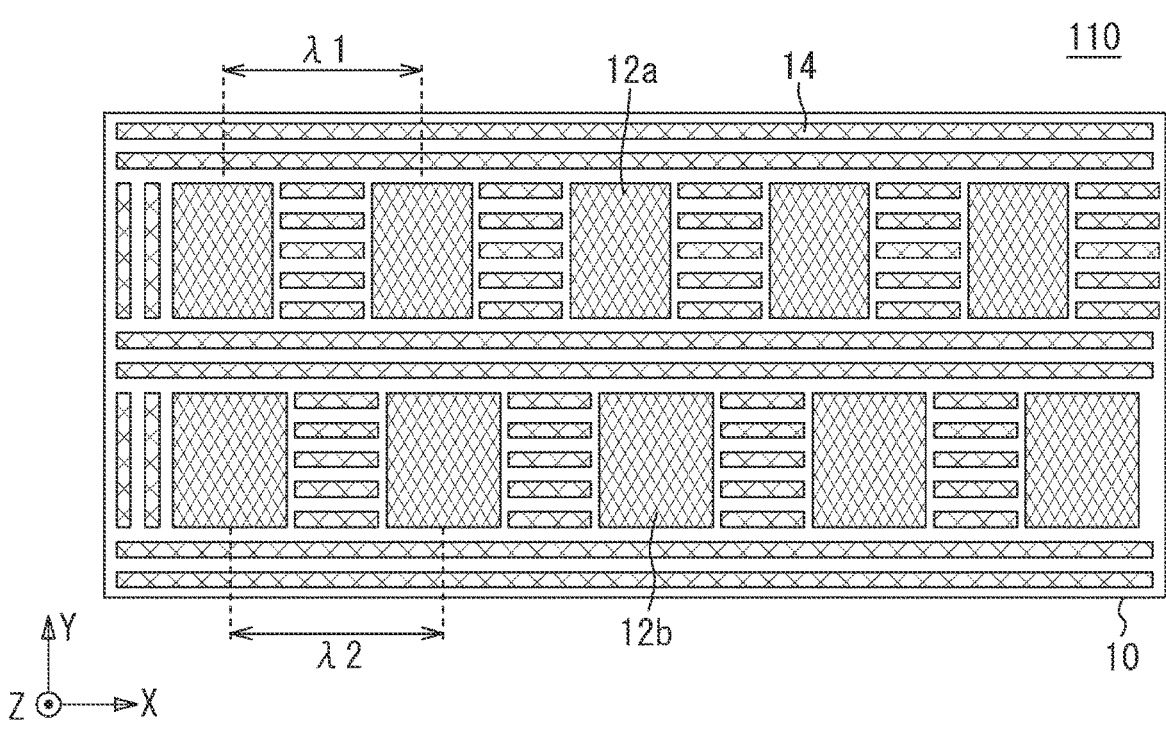
FIG. 7A and FIG. 7B are plan views illustrating scales according to modified embodiments 1 and 2 of a first embodiment.
Figure 7B:
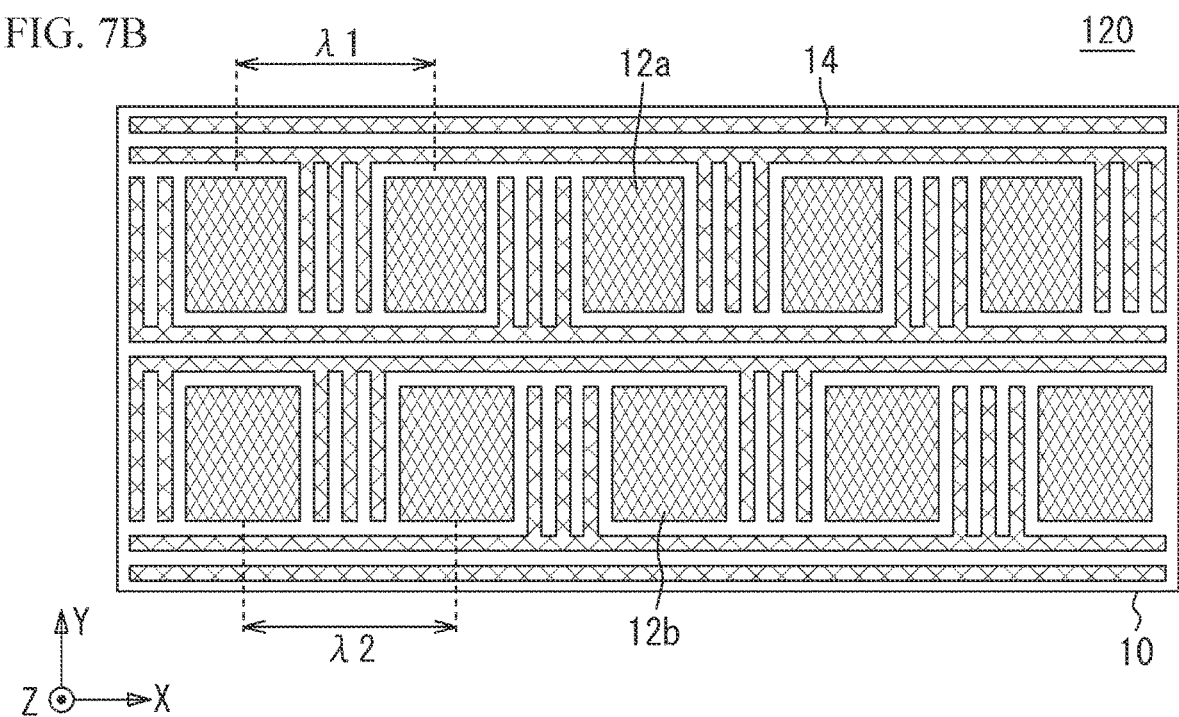
Figure 8:
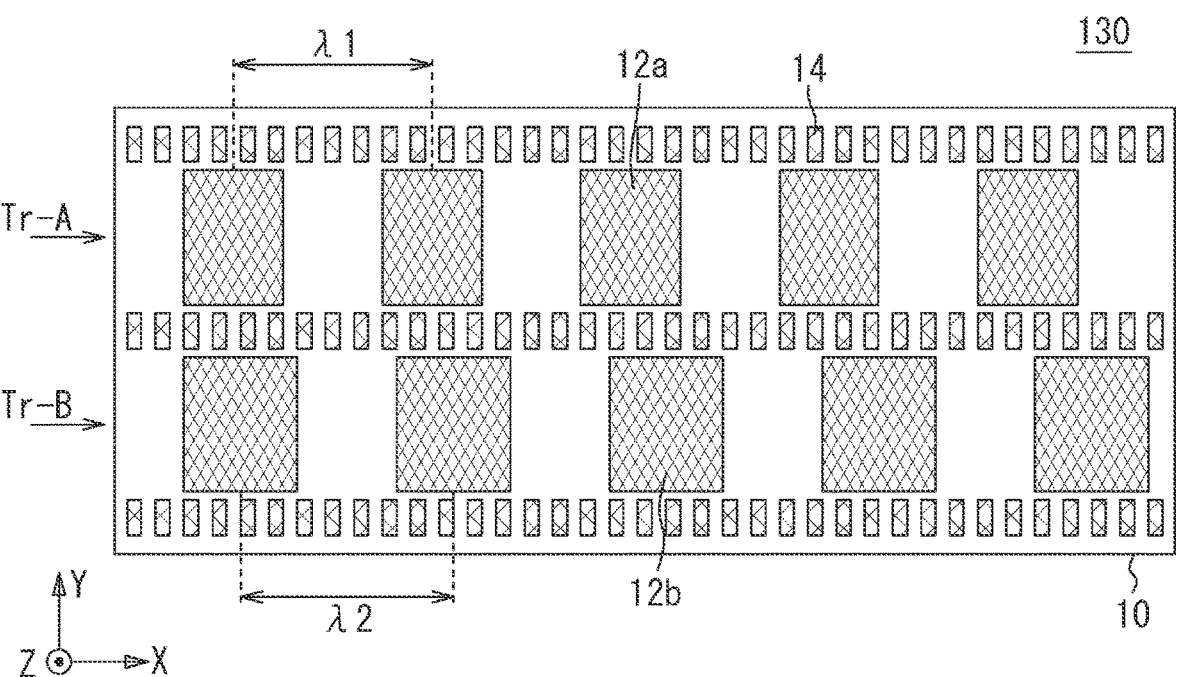
FIG. 8 is a plan view illustrating a scale according to a modified embodiment 3 of a first embodiment.

[Modified embodiment] FIG. 7A and FIG. 7B are plan views illustrating scales 110 and 120 according to modified examples 1 and 2 of the first embodiment. FIG. 8 is a plan view illustrating a scale 130 according to a modified embodiment 3 of the first embodiment.

In the scale 100 of the first embodiment, as illustrated in FIG. 3, the plurality of dummy patterns 14 have a rectangular shape elongated in the Y-axis direction. On the other hand, in the scale 110 of the modified embodiment 1, as illustrated in FIG. 7A, most of the plurality of dummy patterns 14 have a rectangular shape elongated in the X-axis direction, and some are elongated in the Y-axis direction. Thus, there is no restriction on the orientation of the dummy pattern 14 in the longitudinal direction. The orientation of the dummy pattern 14 in the longitudinal direction may be inclined with respect to the X-axis direction and the Y-axis direction.

As illustrated in FIG. 7B, in the scale 120 of the modified embodiment 2, some of the plurality of dummy patterns 14 have T-shaped and L-shaped branched portions. Thus, the dummy pattern 14 may have a shape having a branched portion. Moreover, the dummy pattern 14 may have a shape having a curved portion.

As illustrated in FIG. 8, in the scale 130 of the modified embodiment 3, the dummy patterns 14 are not provided on the first track Tr_A and the second track Tr_B. The dummy pattern 14 is formed in a region between the first track Tr_A and the second track Tr_B, a region located opposite to the second track Tr_B with respect to the first track Tr_A, and a region opposite to the first track Tr_A with respect to the second track Tr_B. Thus, the dummy pattern 14 may be provided only in a part of the area other than the area where the scale patterns 12a and 12b are provided.

Figure 9A:
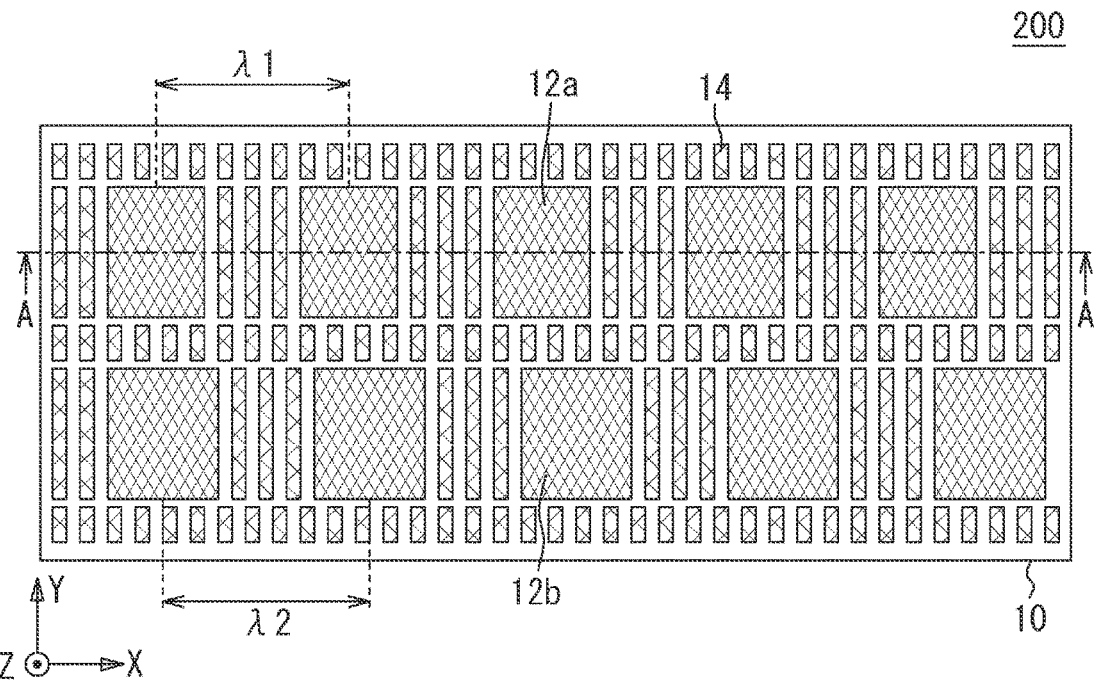
FIG. 9A is a plan view illustrating a scale according to a second embodiment.
Figure 9B:
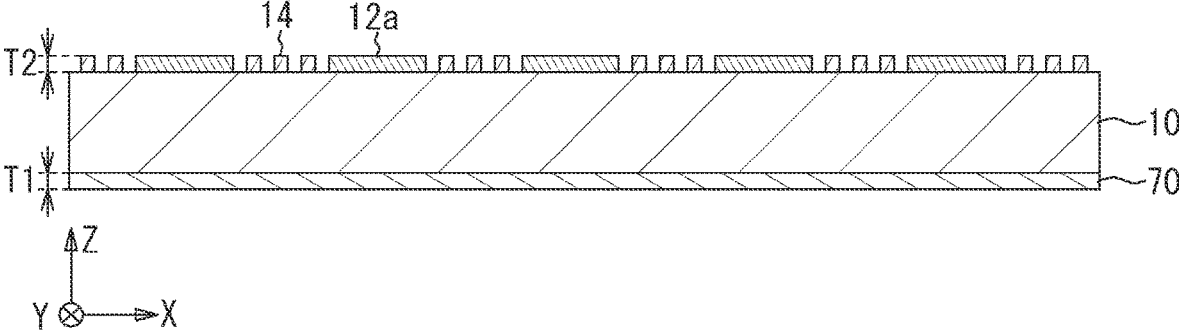
FIG. 9B is a sectional view taken along a line A-A of FIG. 9A.

(Second embodiment) FIG. 9A is a plan view illustrating a scale 200 according to a second embodiment. FIG. 9B is a cross-sectional view taken along a line A-A of FIG. 9A. As illustrated in FIG. 9A and FIG. 9B, the scale 200 of the second embodiment is provided with a conductor film 70 covering the back surface of the substrate 10. The conductor film 70 is provided on the entire back surface of the substrate 10. The conductor film 70 is made of the same conductor as the scale patterns 12a, 12b and the dummy pattern 14, for example. Since other configurations are the same as those of the scale 100 of the first embodiment, description thereof is omitted.

According to the second embodiment, the conductor film 70 (first conductor film) is provided covering the back surface of the substrate 10. When the conductor film 70 is provided on the back surface of the substrate 10, the scale patterns 12a and 12b and the dummy pattern 14 are provided on the front surface of the substrate 10, so that the difference in the volume of the conductor film between the front and back surfaces of the substrate 10 becomes smaller compared to the case where the scale patterns 12a and 12b alone are provided. Therefore, warping of the substrate 10 caused by the stress difference between the conductor films on the front and back surfaces of the substrate 10 can be reduced, and the pitch accuracy of the scale patterns 12a and 12b can be improved. From the viewpoint of suppressing the warping of the substrate 10, it is preferable that the scale patterns 12a, 12b, the dummy pattern 14, and the conductor film 70 are made of the same conductor. Moreover, it is preferable that the thickness T1 of the conductor film 70 is 0.9 times or more and 1.1 times or less of the thickness T2 of the scale patterns 12a and 12b and the dummy pattern 14. It is more preferable that the thickness T1 of the conductor film 70 is 0.95 times or more and 1.05 times or less of the thickness T2 of the scale patterns 12a and 12b and the dummy pattern 14. It is still more preferable that the thickness T1 of the conductor film 70 is 0.98 times or more and 1.02 times or less of the thickness T2 of the scale patterns 12a and 12b and the dummy pattern 14.

Figure 10A:
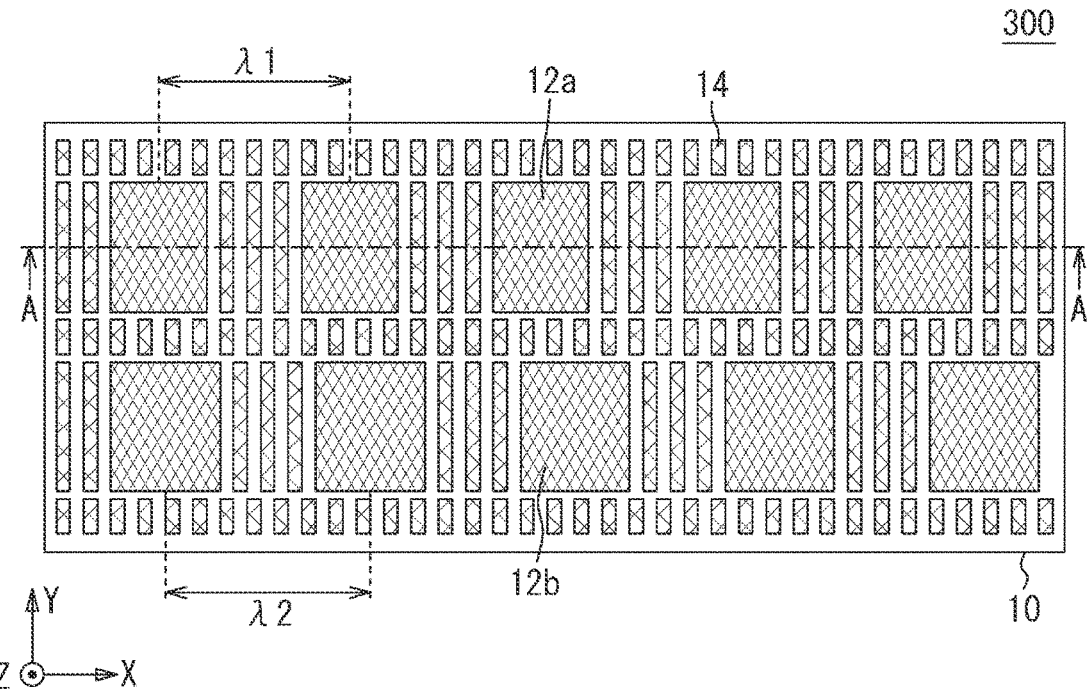
FIG. 10A is a plan view illustrating a scale according to a third embodiment.
Figure 10B:
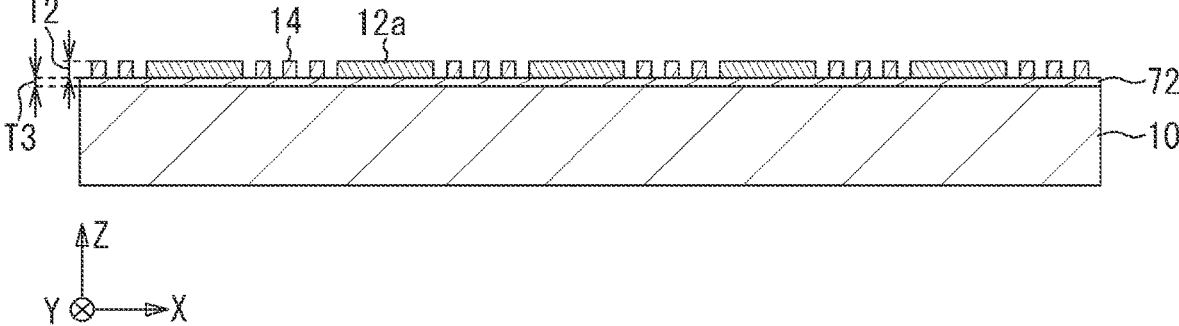
FIG. 10B is a cross-sectional view taken along a line A-A of FIG. 10A.

(Third embodiment) FIG. 10A is a plan view illustrating a scale 300 according to a third embodiment. FIG. 10B is a cross-sectional view taken along a line A-A of FIG. 10A. As illustrated in FIG. 10A and FIG. 10B, a conductor film 72 is provided on the surface of the substrate 10 in the scale 300 of the third embodiment. The plurality of scale patterns 12a and 12b and the plurality of dummy patterns 14 are provided on the conductor film 72. A thickness T3 of the conductor film 72 is less than half of the thickness T2 of the scale patterns 12a, 12b and the dummy pattern 14. Since other configurations are the same as those of the scale 100 of the first embodiment, description thereof is omitted.

According to the third embodiment, the conductor film 72 (second conductor film) having the thickness T3 that is less than half the thickness T2 of the scale patterns 12a and 12b and the dummy pattern 14 is provided on the surface of the substrate 10. The plurality of scale patterns 12a and 12b and the plurality of dummy patterns 14 are provided on the conductor film 72. This reduces the amount of the conductor film to be removed when forming the plurality of scale patterns 12a and 12b and the plurality of dummy patterns 14 by laser processing or etching the conductor film. Therefore, the processing time can be shortened and the load on the environment can be reduced. Further, since the thickness T3 of the conductor film 72 is half or less than the thickness T1 of the scale patterns 12a, 12b and the dummy pattern 14, the induced electromotive current is less likely to occur in the conductor film 72. The thickness T3 of the conductor film 72 is preferably ⅓ or less, more preferably ¼ or less, still more preferably ⅛ or less of the thickness T2 of the scale patterns 12a and 12b and the dummy pattern 14 in order to make it difficult for an induced electromotive current to occur in the conductor film 72.

Figure 11:
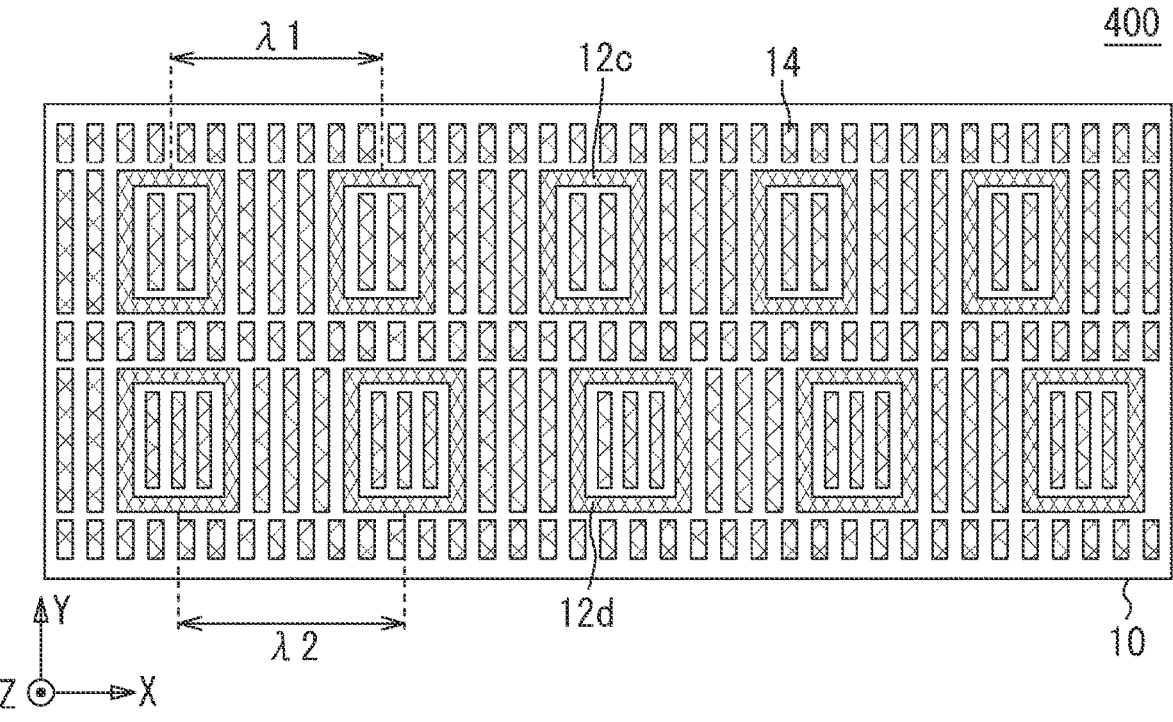
FIG. 11 is a plan view illustrating a scale according to a fourth embodiment.

(Fourth embodiment) FIG. 11 is a plan view illustrating a scale 400 according to a fourth embodiment. As illustrated in FIG. 11, in the scale 400 of the fourth embodiment, the scale patterns 12a and 12b, which are plate-shaped conductor patterns without holes, are replaced by scale patterns 12c and 12d, which are closed-loop coil-shaped conductor patterns. The dummy pattern 14 is also provided inside the closed-loop coil shapes of the scale patterns 12c and 12d. Since other configurations are the same as those of the scale 100 of the first embodiment, description thereof is omitted.

The scale pattern provided on the surface of the substrate 10 may be a plate-shaped conductive pattern without holes such as the scale patterns 12a and 12b of the first to third embodiments, or may be closed loop coil-shaped conductor patterns such as the scale patterns 12c and 12d of the fourth embodiment.

Figure 12A:
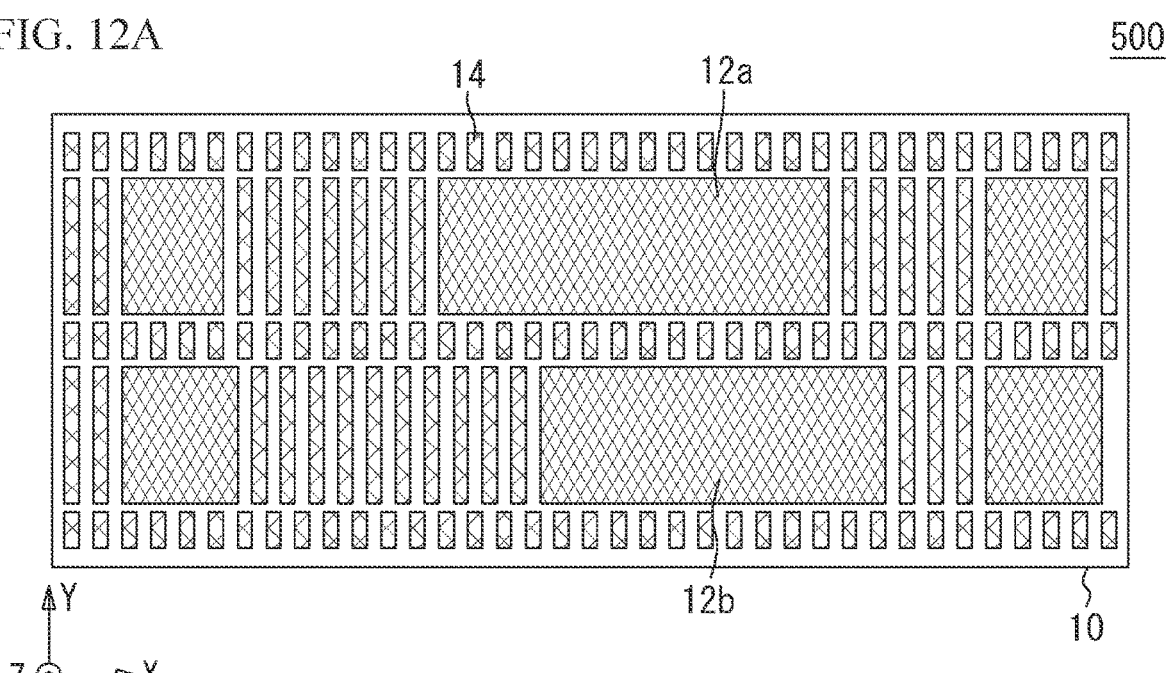
FIG. 12A is a plan view illustrating a scale according to a fifth embodiment.
Figure 12B:
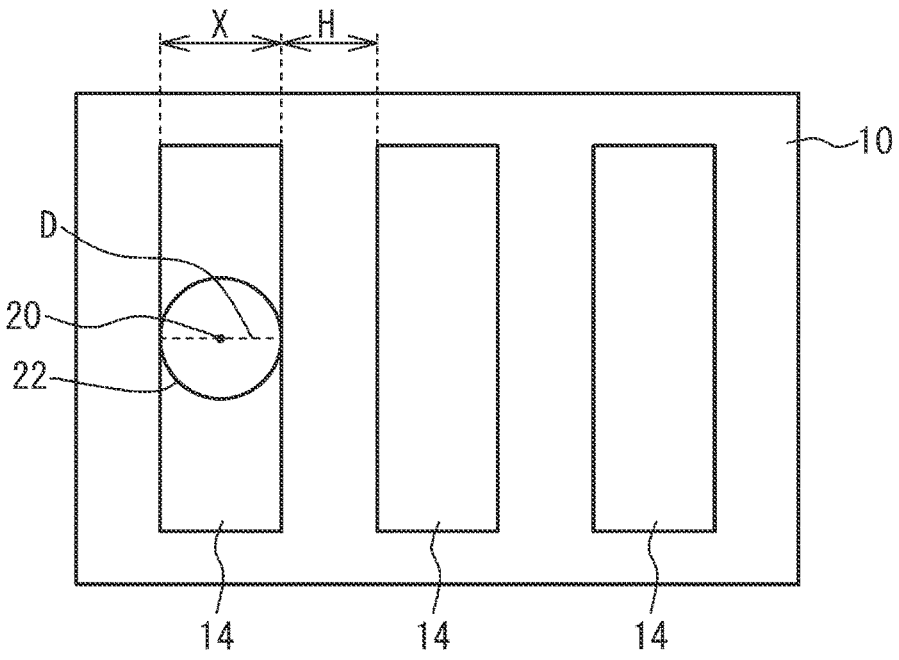
FIG. 12B is a plan view illustrating a dummy pattern in a fifth embodiment.

(Fifth embodiment) FIG. 12A is a plan view illustrating a scale 500 according to a fifth embodiment. FIG. 12B is a plan view illustrating the dummy pattern 14 according to the fifth embodiment. As illustrated in FIG. 12A, in the scale 500 of the fifth embodiment, the plurality of scale patterns 12a are arranged along the X-axis direction, but are not arranged periodically. The plurality of scale patterns 12a include the scale patterns 12a having different lengths in the X-axis direction. Similarly, the plurality of scale patterns 12b are arranged along the X-axis direction, but are not arranged periodically. The plurality of scale patterns 12b include the scale patterns 12b having different lengths in the X-axis direction.

As illustrated in FIG. 12B, the diameter D of the largest circle 22 which is the circle contacting the side of the outline of the dummy pattern 14 when the diameter is increased with the point 20 in the dummy pattern 14 as the center is ½ or less of the width W (see FIG. 2) of the receiving coil 34 in the X-axis direction (measurement direction). The diameter D of the largest circle 22 which is a circle contacting the side of the outer shape of the dummy pattern 14 when the diameter is increased around the point 20 in the dummy pattern 14 is less than or equal to ½ of the width W (illustrated in FIG. 2) of the receiving coil 34 in the X-axis direction. In other words, the width X of the dummy pattern 14 is ½ or less of the width W of the receiving coil 34 in the X-axis direction. Since other configurations are the same as those of the scale 100 of the first embodiment, description thereof is omitted.

According to the fifth embodiment, as illustrated in FIG. 12A, the plurality of dummy patterns 14 made of the same conductor as the scale patterns 12a and 12b are provided on the surface of the substrate 10 other than the regions where the plurality of scale patterns 12a and 12b are provided. Therefore, like the first embodiment, it is possible to shorten the processing time and reduce the load on the environment. In addition, as illustrated in FIG. 12B, the dummy pattern 14 has a diameter D of the largest circle 22 that can be formed in the dummy pattern 14 centering on the point 20 in the dummy pattern 14 is ½ or less of the width W in the X-axis direction of the receiving coil 34 (measurement direction). Even in this case, it is possible to suppress the generation of induced electromotive current in the dummy pattern 14, so that the influence on the measurement using the electromagnetic coupling between the scale 500 and the detection head 30 can be suppressed. The diameter D of the circle 22 is preferably ⅓ or less, more preferably ¼ or less, and even more preferably ⅕ or less of the width W of the receiving coil 34 so that the induced electromotive current is less likely to occur in the dummy pattern 14.

Figure 13A:
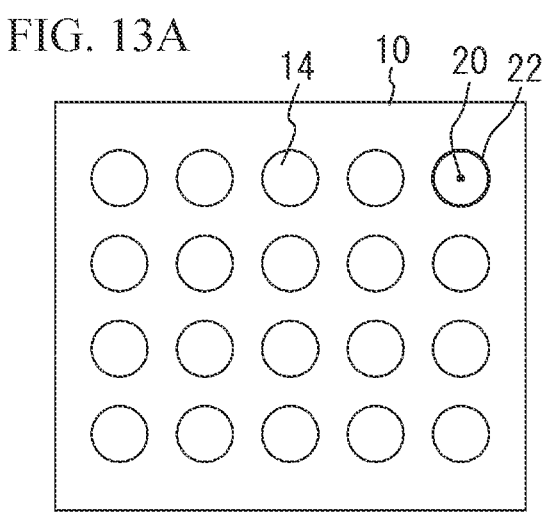
FIG. 13A to FIG. 13E are plan views illustrating other shapes of dummy patterns.
Figure 13B:
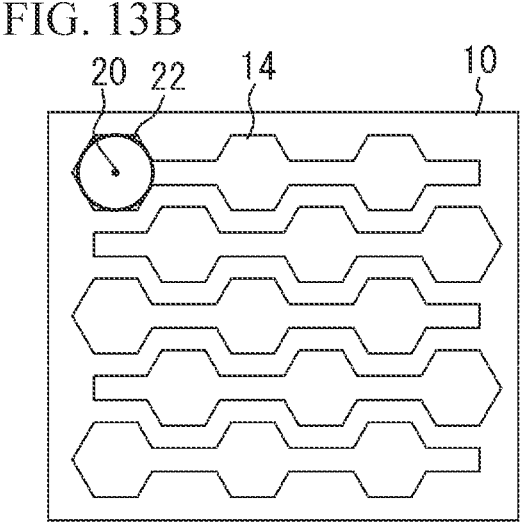
Figure 13C:
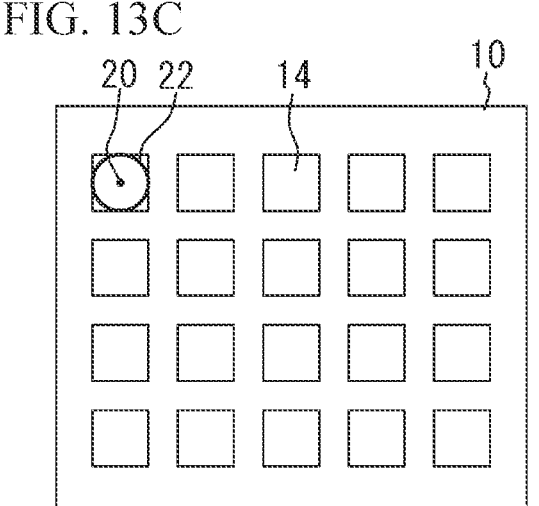
Figure 13D:
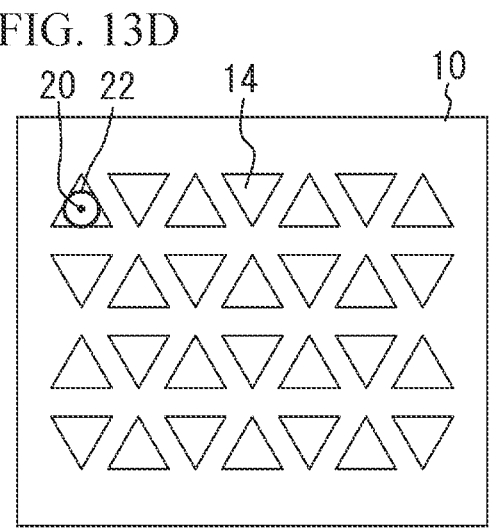
Figure 13E:
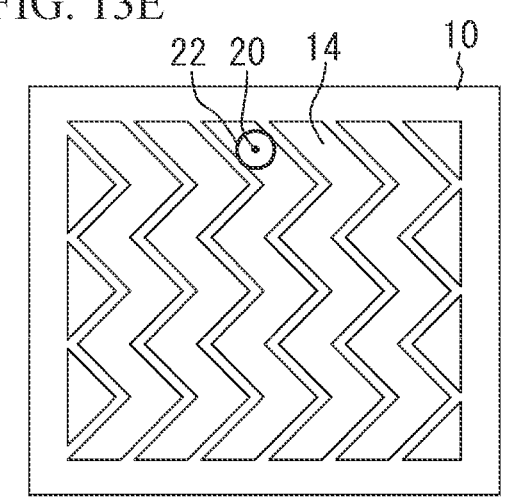

In the first to fifth embodiments, the case where the dummy pattern 14 has a rectangular shape in a plan view has been exemplified, but it is not limited to this case. FIG. 13A to FIG. 13E are plan views illustrating other shapes of the dummy pattern 14. As illustrated in FIG. 13A, the dummy pattern 14 may be a circular conductor pattern. As illustrated in FIG. 13B, the dummy pattern 14 may have a shape in which the shaped conductor patterns are connected by a connection conductor pattern. The dummy pattern 14 may have a shape in which adjacent polygonal conductor patterns such as hexagons are connected by a connection conductor pattern. As illustrated in FIG. 13C, the dummy pattern 14 may be a square conductor pattern. As illustrated in FIG. 13D, the dummy pattern 14 may be a triangular conductor pattern. As illustrated in FIG. 13E, the dummy pattern 14 may be a triangular wave-shaped conductor pattern. Also, the dummy pattern 14 may include at least one pattern of a rectangular pattern, a circular pattern, a triangular pattern, a polygonal pattern with pentagons or more, and a triangular wave pattern.

As illustrated in FIG. 13A to FIG. 13E, the dummy pattern 14 may be conductor patterns of various shapes. However, in any case, in order to suppress the generation of the induced electromotive current in the dummy pattern 14, it is required that the diameter of the largest circle 22 that can be formed in the dummy pattern 14 centering on the point 20 in the dummy pattern 14 is ¼ or less of the period of the scale pattern. Alternatively, it is required that the diameter of the largest circle 22 that can be formed in the dummy pattern 14 centered at the point 20 in the dummy pattern 14 is ½ or less of the width of the receiving coil 34 in the measurement direction.

Figure 14:
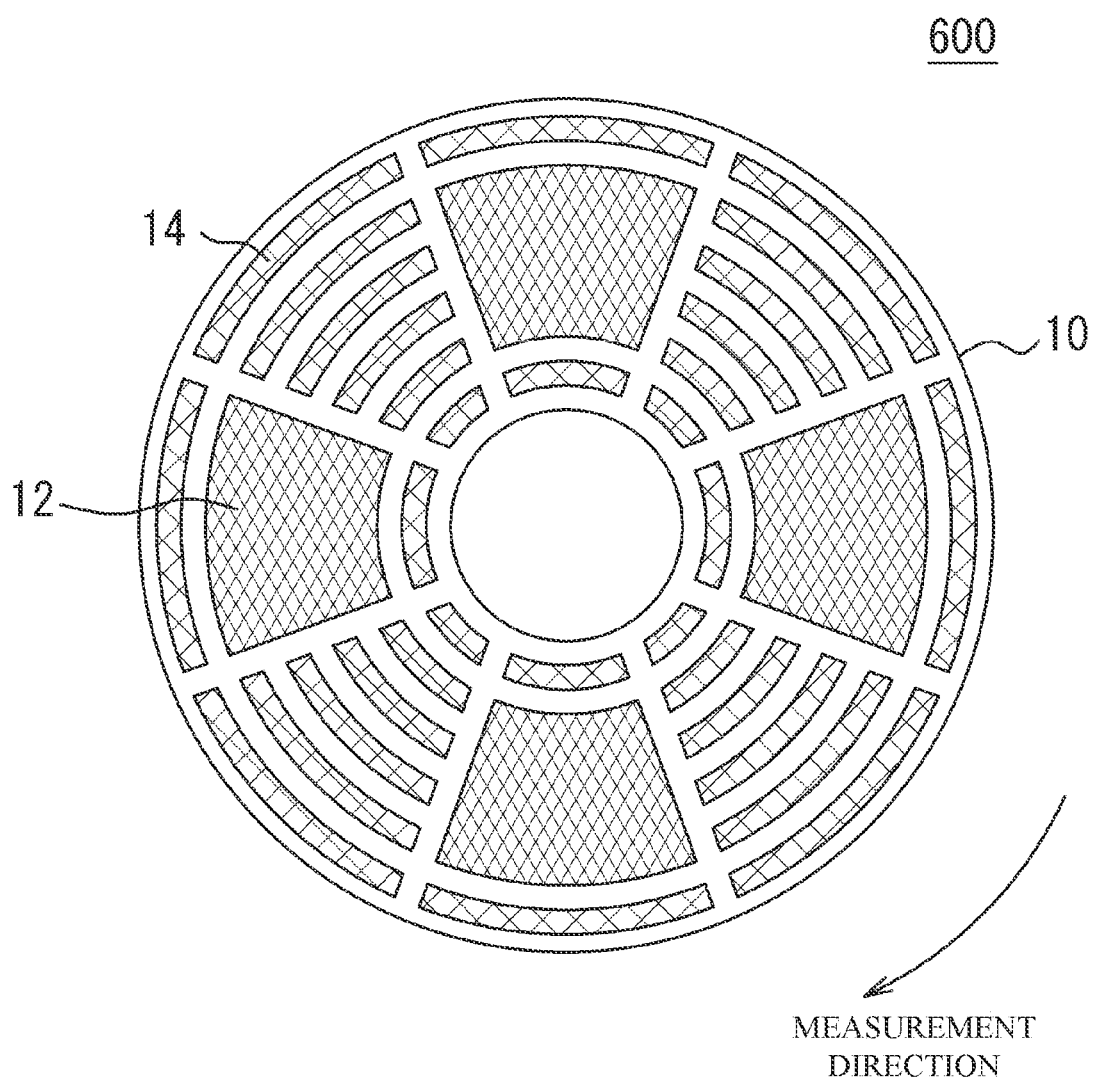
FIG. 14 is a plan view illustrating a scale according to a sixth embodiment.

(Sixth embodiment) FIG. 14 is a plan view illustrating a scale 600 according to a sixth embodiment. As illustrated in FIG. 14, the scale 600 of the sixth embodiment is a scale used in a rotary encoder, and has the plurality of scale patterns 12 arranged on the surface of a substrate 10 at regular intervals in the circumferential direction. The plurality of dummy patterns 14 are provided on at least a part of the surface of the substrate 10 other than the area where the plurality of scale patterns 12 are provided. In the sixth embodiment, the circumferential direction of the substrate 10 is the measurement direction. Since other configurations are the same as those of the first embodiment, description thereof is omitted.

In the first to fifth embodiments, the case of the scale used in the linear encoder is described as an example. However, the present invention is not limited to this case, and may be a scale used for a rotary encoder as in the sixth embodiment, or a scale used for other encoders such as an arc encoder.

In the first to sixth embodiments, as illustrated in FIG. 5A to FIG. 5D, after the conductor film 60 is formed on the substrate 10, the conductor film 60 is processed by laser processing or etching. Thus, a scale pattern and a dummy pattern are formed by patterning by processing, as an example. However, the present invention is not limited to this case, and the scale pattern and dummy pattern may be formed by a printing method, a plating method, or a lift-off method. Even in this case, the effect of reducing the warp of the substrate 10 can be obtained as in the second embodiment.

FIG. 1A shows an example of the electromagnetic induction type encoder 1000 including the scale 100 of the first embodiment. Any one of the scales of the modified embodiments 1 to 3 of the first embodiment and the second to sixth embodiments may be provided in the electromagnetic induction type encoder 1000.

The present invention is not limited to the specifically disclosed embodiments and variations but may include other embodiments and variations without departing from the scope of the present invention.

What is claimed is:

1. A scale comprising:
a substrate;
a plurality of scale patterns that are arranged along a measurement direction with a constant period on a surface of the substrate and are made of conductor; and
a plurality of dummy patterns that are provided on at least a part of a region on the surface of the substrate where the plurality of scale patterns are not provided, and are made of the same conductors as the plurality of scale patterns,
wherein a diameter of a largest circle that can be formed in each of the plurality of dummy patterns centering on a point in each of the plurality of dummy patterns is ¼ or less of the period of the plurality of scale patterns, and
wherein the plurality of dummy patterns are electrically isolated from the plurality of scale patterns.

2. The scale as claimed in claim 1 further comprising:
a first conductor film that covers a back surface of the substrate.

3. The scale as claimed in claim 1 further comprising:
a second conductor film that has a thickness which is ½ or less of thicknesses of the plurality of scale patterns and the plurality of dummy patterns,
wherein the plurality of scale patterns and the plurality of dummy patterns are provided on the second conductor film.

4. The scale as claimed in claim 1, wherein the plurality of dummy patterns include at least one pattern of a rectangular pattern, a circular pattern, a triangular pattern, a polygonal pattern with pentagons or more, and a triangular wave pattern.

5. A scale comprising:
a substrate;
a plurality of scale patterns that are arranged along a measurement direction on a surface of the substrate and are made of conductor; and
a plurality of dummy patterns that are provided on at least a part of a region on the surface of the substrate where the plurality of scale patterns are provided, and are made of the same conductors as the plurality of scale patterns,
wherein a diameter of a largest circle that can be formed in each of the plurality of dummy patterns centering on a point in each of the plurality of dummy patterns is ½ or less of a width in the measurement direction of a receiving coil that is electromagnetically coupled with magnetic flux generated by the plurality of scale patterns and detects a phase of the magnetic flux.

6. The scale as claimed in claim 5 further comprising:

a first conductor film that covers a back surface of the substrate.

7. The scale as claimed in claim 5 further comprising:

a second conductor film that has a thickness which is ½ or less of thicknesses of the plurality of scale patterns and the plurality of dummy patterns, wherein the plurality of scale patterns and the plurality of dummy patterns are provided on the second conductor film.

8. The scale as claimed in claim 5, wherein the plurality of dummy patterns include at least one pattern of a rectangular pattern, a circular pattern, a triangular pattern, a polygonal pattern with pentagons or more, and a triangular wave pattern.

9. A manufacturing method of a scale comprising:

forming a plurality of scale patterns that are arranged along a measurement direction with a constant period on a surface of a substrate and are made of conductor; and forming a plurality of dummy patterns that are provided on at least a part of a region on the surface of the substrate where the plurality of scale patterns are not provided, and are made of the same conductors as the plurality of scale patterns, wherein a diameter of a largest circle that can be formed in each of the plurality of dummy patterns centering on a point in each of the plurality of dummy patterns is ¼ or less of the period of the plurality of scale patterns, and wherein the plurality of dummy patterns are electrically isolated from the plurality of scale patterns.

10. The method as claimed in claim 9 further comprising:

forming a conductor film on the surface of the substrate, wherein, in the forming of the plurality of scale patterns and the forming of the plurality of dummy patterns, the plurality of scale patterns and the plurality of dummy patterns are formed by laser-processing the conductor film or etching the conductor film.

11. A manufacturing method of a scale that is used for an electromagnetic induction type encoder that has the scale and a detection head configured to move relative to the scale in a measurement direction, the detection head having a receiving coil configured to be electromagnetically coupled to magnetic flux generated by the scale and detect a phase of the magnetic flux, the method comprising:

forming a plurality of scale patterns that are arranged along a measurement direction on a surface of the substrate and are made of conductor; and forming a plurality of dummy patterns that are provided on at least a part of a region on the surface of the substrate where the plurality of scale patterns are provided, and are made of the same conductors as the plurality of scale patterns, wherein a diameter of a largest circle that can be formed in each of the plurality of dummy patterns centering on a point in each of the plurality of dummy patterns is ½ or less of a width in the measurement direction of a receiving coil.

12. The method as claimed in claim 11 further comprising:

forming a conductor film on the surface of the substrate, wherein, in the forming of the plurality of scale patterns and the forming of the plurality of dummy patterns, the plurality of scale patterns and the plurality of dummy patterns are formed by laser-processing the conductor film or etching the conductor film.

* * * * *